United States Patent
Gaxiola et al.

(10) Patent No.: US 9,178,348 B2
(45) Date of Patent: Nov. 3, 2015

(54) DC VOLTAGE LINE CIRCUIT BREAKER

(75) Inventors: Enrique Gaxiola, Aix en Provence (FR); Jakob Vogelsang, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 55 days.

(21) Appl. No.: 14/344,664

(22) PCT Filed: Aug. 15, 2012

(86) PCT No.: PCT/EP2012/065956
§ 371 (c)(1),
(2), (4) Date: Mar. 13, 2014

(87) PCT Pub. No.: WO2013/037589
PCT Pub. Date: Mar. 21, 2013

(65) Prior Publication Data
US 2014/0226247 A1      Aug. 14, 2014

(30) Foreign Application Priority Data
Sep. 13, 2011   (DE) .................. 10 2011 082 568

(51) Int. Cl.
| | | |
|---|---|---|
| *H02H 3/00* | (2006.01) | |
| *H02H 7/00* | (2006.01) | |
| *H02H 3/08* | (2006.01) | |
| *H02H 9/02* | (2006.01) | |
| *H01H 73/00* | (2006.01) | |
| *H02H 3/087* | (2006.01) | |
| *H01H 33/59* | (2006.01) | |
| *H01H 9/56* | (2006.01) | |
| *H02H 3/02* | (2006.01) | |

(52) U.S. Cl.
CPC ............. *H02H 3/087* (2013.01); *H01H 33/596* (2013.01); *H02H 9/02* (2013.01); *H01H 9/56* (2013.01); *H02H 3/021* (2013.01)

(58) Field of Classification Search
CPC ............................ H02H 3/087; H01H 33/596
USPC ...................... 361/2–13, 93.1, 115
See application file for complete search history.

(56) References Cited

U.S. PATENT DOCUMENTS

| | | | | |
|---|---|---|---|---|
| 3,737,724 A * | 6/1973 | Salge et al. | ........................ | 361/8 |
| 3,758,790 A * | 9/1973 | Kind et al. | ........................ | 361/3 |
| 3,868,550 A | 2/1975 | Knauer et al. | | |
| 4,110,806 A * | 8/1978 | Murano et al. | ..................... | 361/4 |
| 4,216,513 A * | 8/1980 | Tokuyama et al. | ............. | 361/13 |

(Continued)

FOREIGN PATENT DOCUMENTS

| | | |
|---|---|---|
| DE | 2405835 | 9/1974 |
| DE | 4304863 A1 | 8/1993 |

(Continued)

*Primary Examiner* — Stephen W Jackson
*Assistant Examiner* — Christopher Clark
(74) *Attorney, Agent, or Firm* — Laurence A. Greenberg; Werner H. Stemer; Ralph E. Locher

(57) ABSTRACT

A direct current circuit breaker has a first to fifth node. A first breaker is arranged between the first node and the fourth node, and a second breaker is arranged between the fourth node and the third node. A parallel circuit of a commutator device is arranged parallel to an energy absorber between the fourth node and the fifth node, and a switch is arranged in series to the parallel circuit. A series circuit containing a semiconductor switch and a resistor is arranged between the second node and the third node.

8 Claims, 3 Drawing Sheets

(56) References Cited

U.S. PATENT DOCUMENTS

| | | | |
|---|---|---|---|
| 4,305,107 A * | 12/1981 | Murano et al. | 361/4 |
| 4,442,469 A * | 4/1984 | Yanabu et al. | 361/4 |
| 4,740,858 A * | 4/1988 | Yamaguchi et al. | 361/4 |
| 5,214,557 A * | 5/1993 | Hasegawa et al. | 361/4 |
| 5,402,297 A * | 3/1995 | Ouchi et al. | 361/4 |
| 5,452,170 A * | 9/1995 | Ohde et al. | 361/13 |
| 5,517,378 A * | 5/1996 | Asplund et al. | 361/4 |
| 5,737,162 A * | 4/1998 | Ito et al. | 361/8 |
| 8,947,843 B2 * | 2/2015 | Juhlin | 361/115 |
| 2014/0233140 A1 * | 8/2014 | Gaxiola et al. | 361/67 |
| 2014/0299579 A1 * | 10/2014 | Hartmann et al. | 218/145 |
| 2015/0022928 A1 * | 1/2015 | Mohaddes Khorassani | 361/93.7 |

FOREIGN PATENT DOCUMENTS

| | | |
|---|---|---|
| EP | 1480241 A1 | 11/2004 |
| GB | 2251979 A | 7/1992 |
| WO | WO 2011141428 A1 * | 11/2011 |

* cited by examiner

DC VOLTAGE LINE CIRCUIT BREAKER

BACKGROUND OF THE INVENTION

Field of the Invention

The present invention relates to a DC voltage line circuit breaker, a method for operating a DC voltage line circuit breaker, and a DC line system.

Electrical energy is generally generated in power stations as three-phase alternating current. For transmission, this energy is transformed by power transformers to very high electrical AC voltages and transmitted over overhead lines. In the case of very long overhead lines, however transmission of energy with direct current is associated with lower losses and is therefore more favorable.

In the case of DC transmission, however, there are difficulties in the prior art in controlling power flows in meshed line systems. Therefore, for DC transmission, almost exclusively point-to-point connections without any branches or meshes have been used until now. However, for the future, construction and expansion of DC line systems is planned. For this, DC voltage line circuit breakers are needed in order to increase the availability of the planned DC line systems. DC voltage line circuit breakers are used for selectively disconnecting parts of a line system in the event of a fault and thus preventing failure of the entire line system.

BRIEF SUMMARY OF THE INVENTION

The object of the present invention consists in providing an improved DC voltage line circuit breaker. A further object of the present invention consists in specifying a method for operating a DC voltage line circuit breaker. A further object of the present invention consists in providing a more failsafe DC line system. Preferred developments are specified in the dependent claims.

The DC voltage line circuit breaker according to the invention has a first node to a fifth node, wherein
  a first interrupter is arranged between the first node and the fourth node,
  a second interrupter is arranged between the fourth node and the third node,
  a parallel circuit comprising a commutator device and an energy absorber is arranged between the fourth node and the fifth node, and a switch is arranged in series with said parallel circuit,
  a series circuit comprising a semiconductor switch and a resistor is arranged between the second node and the third node. The semiconductor switch is preferably a thyristor.

In this case, a first DC voltage can be applied between the first node and the second node, and a second DC voltage can be tapped off between the third node and the second node. The commutator device preferably has a series circuit comprising a commutator resistor, a commutator coil and a commutator capacitor.

Preferably, the DC voltage line circuit breaker comprises a control device, which is designed to perform the following steps in the event of a disconnection:
  closing the switch (190);
  opening the second interrupter (120);
  switching on the thyristor (260);
  opening the first interrupter (110).

For the invention, it has been identified that the additional thyristor branch makes it possible, with suitable actuation, to force very quickly a current zero crossing. This forced zero crossing advantageously allows the line protected by the DC voltage line circuit breaker to be interrupted without extreme transient recovery voltages occurring. This advantageously enables a very compact and inexpensive embodiment of the DC voltage line circuit breaker and shortens the maximum time needed for complete current interruption and selective disconnection of part of a line system.

Preferably, the second interrupter is a hybrid interrupter. In a preferred embodiment of the DC voltage line circuit breaker, the first interrupter is an SF6 interrupter. Advantageously, SF6 interrupters are suitable for interrupting very high voltages. Preferably, the second interrupter is a vacuum interrupter. Advantageously, vacuum interrupters are suitable for high switching frequencies and are largely maintenance-free.

A method according to the invention for operating a DC voltage line circuit breaker which is designed in the above-mentioned manner begins in a state in which the switch is open and comprises steps for detecting a rise in a current intensity of an electrical current flowing in the DC voltage line circuit breaker, for closing the switch and for opening the second interrupter. Further steps comprise switching-on of the semiconductor switch, for example the thyristor, and opening the first interrupter. Advantageously, this method allows a physical interruption of a line system with an energy level of up to 20 MJ in a time period of approximately 10 ms. This advantageously corresponds to practice to this day in AC line systems. A DC line system according to the invention has a DC voltage line circuit breaker of the abovementioned type. Advantageously, in this DC line system, parts of the line system can be disconnected selectively in the event of a fault without this resulting in failure of the entire DC line system.

In this case, the DC voltage line circuit breaker is preferably arranged in the DC line system in such a way that the first node represents an input side with a connection to a terminal of a DC voltage source, and the second node is connected to the other terminal of the DC voltage source. In a preferred embodiment of the DC line system, said DC line system has at least one mesh. Advantageously, the DC voltage line circuit breaker used in the DC line system enables a meshed configuration of the DC line system.

BRIEF DESCRIPTION OF THE SEVERAL VIEWS OF THE DRAWING

The above-described properties, features and advantages of this invention and the way in which these are achieved will be made clearer and more easily understandable in connection with the following description of the exemplary embodiments, which will be explained in more detail in connection with the drawings, in which.

DESCRIPTION OF THE INVENTION

Figure 1:
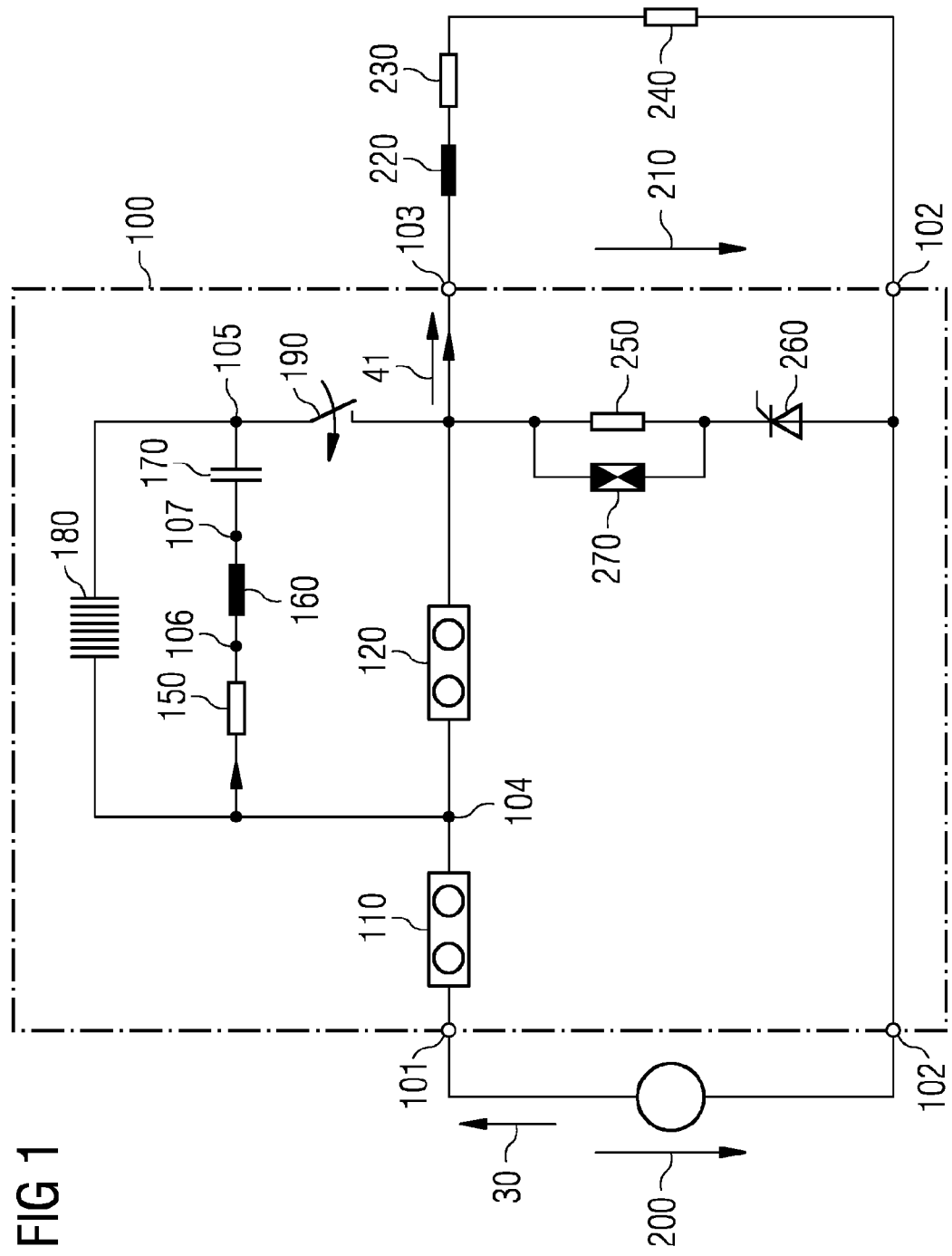
FIG. 1 shows a circuit arrangement of a DC voltage line circuit breaker.

FIG. 1 shows a circuit arrangement of a DC voltage line circuit breaker 100. The DC voltage line circuit breaker can be integrated in a DC line system in order to disconnect selectively part of the DC line system in the event of a short circuit. The DC voltage line circuit breaker 100 can be intended, for example, for use in a high-voltage DC line system. The DC voltage line circuit breaker 100 in a DC line system enables protection of the positive phase with respect to the ground potential, the negative phase with respect to the ground potential, and the positive phase with respect to the negative phase.

The DC voltage line circuit breaker 100 has a first to a seventh node 101 . . . 107. The nodes 101 . . . 107 are circuit nodes of the DC voltage line circuit breaker 100 which are each at an electrical potential. The nodes 101 . . . 107 can accordingly each also comprise electrical conductor sections if the electrical resistances of these conductor sections are negligible.

A DC voltage 200 can be applied between the first node 101 and the second node 102 of the DC voltage line circuit breaker 100. The DC voltage 200 can be a source voltage, which is applied to a DC line system by a high-voltage rectifier. The first node 101 and the second node 102 in this case form an input side of the DC voltage line circuit breaker 100 and of the DC line system connected to the DC voltage line circuit breaker 100. The DC voltage 200 applied between the first node 101 and the second node 102 can be 500 kV, for example. The DC voltage 200 can also assume higher voltage values of more than 1200 kV, however. In the DC line system in which the DC voltage line circuit breaker 100 is used, the DC voltage 200 can excite a direct current of 20 kA or more.

An output voltage 210 can be tapped off between the third node 103 and the second node 102 of the DC voltage line circuit breaker 100. The output voltage 210 is a DC voltage and substantially corresponds to the DC voltage 200 applied between the first node 101 and the second node 102. In the event of a short circuit, the DC voltage line circuit breaker 100 can interrupt the connection between the first node 101 and the third node 103, however, with the result that the output voltage 210 no longer corresponds to the DC voltage 200.

Line parts of the DC line system in which the DC voltage line circuit breaker 100 is used can be connected to the third node 103 and the second node 102. These parts of the DC line system are illustrated schematically in FIG. 1 by line impedance 220, a line resistance 230 and a load resistance 240.

An auxiliary interrupter 110 is arranged between the first node 101 and the fourth node 104. The auxiliary interrupter 110 serves the purpose of interrupting an electrical connection between the first node 101 and the fourth node 104 in the event of a short circuit.

The DC voltage line circuit breaker 100 has a hybrid interrupter 120 between the fourth node 104 and the third node 103. The hybrid interrupter 120 serves the purpose of interrupting the electrical connection between the fourth node 104 and the third node 103 in the event of a short circuit.

The auxiliary interrupter 110 and the hybrid interrupter 120 can interrupt the electrical connection between the first node 101 and the third node 103 only when an electrical current flowing between the first node 101 and the third node 103 is low, i.e. is close to the value zero. Otherwise, the formation of arcs which cannot be quenched occurs during the interruption of the connection between the first node 101 and the third node 103, which arcs can damage or destroy the auxiliary interrupter 110, the hybrid interrupter 120, the entire DC voltage line circuit breaker 100 or else further parts of a DC line system. Therefore, in the event of a short circuit, the electrical current flowing between the first node 101 and the third node 103 must be reduced to zero within a very short period of time in order that the auxiliary interrupter 110 and the hybrid interrupter 120 can interrupt the electrical connection between the first node 101 and the third node 103. For this purpose, the DC voltage line circuit breaker 100 has a commutator circuit, which is arranged between the fourth node 104 and the fifth node 105.

The commutator circuit of the DC voltage line circuit breaker 100 comprises a commutator resistor 150, a commutator coil 160 and a commutator capacitor 170. The commutator resistor 150 is arranged between the first node 101 and the sixth node 106. The commutator coil 160 is arranged between the sixth node 106 and the seventh node 107. The commutator capacitor 170 is arranged between the seventh node 107 and the fifth node 105. However, it would also be possible to change the sequence of commutator resistor 150, commutator coil 160 and commutator capacitor 170. It is merely essential that the commutator resistor 150, the commutator coil 160 and the commutator capacitor 170 form a series circuit and are arranged between the first node 101 and the fifth node 105.

The commutator circuit serves the purpose of producing an electrical countercurrent through the vacuum interrupter 120, which is in the opposite direction to the conventional current flow through the auxiliary interrupter 110 and the hybrid interrupter 120 and compensates for this current. In this way, the commutator circuit effects a zero crossing of the current flow through the auxiliary interrupter 110 and the hybrid interrupter 120 which makes it possible for the auxiliary interrupter 110 and the hybrid interrupter 120 to interrupt the electrical connection between the first node 101 and the third node 103.

A switch 190 is arranged between the fifth node 105 and the third node 103. The switch 190 can be a semiconductor switch, for example an insulated-gate bipolar transistor (IGBT) or a thyristor (three-terminal semiconductor rectifier, SCR). If the switch 190 is closed, i.e. turned on, the commutator circuit formed from the commutator resistor 150, the commutator coil 160 and the commutator capacitor 170 is connected in parallel with the hybrid interrupter 120.

The DC voltage line circuit breaker 100 furthermore has an energy absorber 180, which is arranged between the fourth node 104 and the fifth node 105. The energy absorber 180 is therefore connected in parallel with the commutator circuit. The energy absorber 180 serves the purpose of absorbing the energy released in the event of a short circuit and an interruption effected by the DC voltage line circuit breaker 100. The energy absorber 180 can comprise, for example, a ZnO varistor stack.

The countercurrent generated by the commutator circuit formed from the commutator resistor 150, the commutator coil 160 and the commutator capacitor 170 can be established using the value of the commutator resistor 150 and the commutator capacitor 170, as follows:

$$L_{Com} = \frac{U_{C_{Com}}}{\frac{di(t)}{dt}}$$

and $$C_{Com} = \frac{I_{Com}}{U_{C_{Com}}} L_{Com}$$

The DC voltage 200 can be 500 kV, for example. A current flowing into the DC voltage line circuit breaker 100 at the first node 101 of the DC voltage line circuit breaker 100 can have a current intensity of 20 kA, for example.

A thyristor series circuit comprising a thyristor 260 and a resistor 250 is arranged between the third node 103 and the second node 102 in the present DC voltage line circuit breaker 100. In turn, a nonlinear energy absorber 270 is connected in parallel with the resistor 250.

During conventional operation of the DC voltage line circuit breaker 100, the switch 190 of the DC voltage line circuit breaker 100 is open. Current flow between the first node 101 and the third node 103 is possible via the auxiliary interrupter 110 and the hybrid interrupter 120. If a short circuit occurs in the DC line system in which the DC voltage line circuit breaker 100 is used, the electrical current flowing through the DC voltage line circuit breaker 100 increases significantly. This is detected by a detection apparatus (not illustrated in FIG. 1). If an excessive rise in the electrical current flowing in the DC voltage line circuit breaker 100 is identified, a disconnection is performed.

Figure 2:
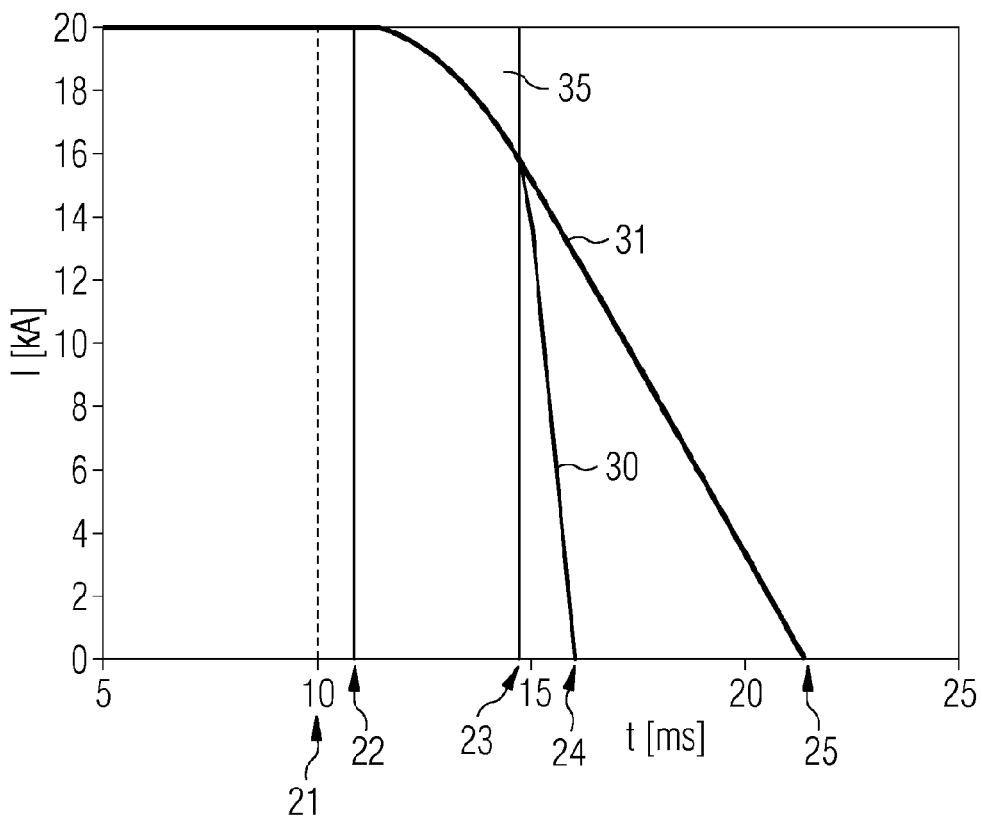
FIG. 2 shows a graph illustrating the source current profile of the circuit arrangement in comparison with a known circuit arrangement.

FIG. 2 shows a first source current profile 31 of the DC voltage source when no thyristor series circuit is being used and, in comparison with this, a second source current profile 30, as results on disconnection by the DC voltage line circuit breaker 100. In this case, a first to fifth time 21 . . . 25 is indicated. If an excessive rise in the electrical current flowing in the DC voltage line circuit breaker 100 is identified, in a first step at the first time 21 approximately 10 ms after identification of the short circuit, the switch 190 is closed, with the result that a conductive connection exists between the fifth node 105 and the third node 103 of the DC voltage line circuit breaker 100.

This results in a current flow between the first node 101 and the third node 103 via the commutator circuit formed from the commutator resistor 150, the commutator coil 160 and the commutator capacitor 170. This current flow compensates for a current flow via the auxiliary interrupter 110 and the hybrid interrupter 120, with the result that the electrical current flowing via the auxiliary interrupter 110 and the hybrid interrupter 120 returns to the value zero.

At this time, the auxiliary interrupter 110 and the hybrid interrupter 120 interrupt the electrically conductive connection between the first node 101 and the third node 103. Owing to inductances in parts of the DC line system which are downstream of the DC voltage line circuit breaker 100, and which are represented by the line impedance 220 in FIG. 1, the electrical current flowing at the third node 103 is still maintained, however, and the electrical energy stored in the DC line system becomes free. This electrical energy is absorbed by the energy absorber 180 without the DC voltage line circuit breaker 100 or other parts of the DC line system being damaged.

In a second step, at the second time 22, at which the current is largely quenched by the hybrid interrupter 120, the hybrid interrupter 120 is opened and therefore the current is temporarily interrupted here. As a consequence, in the time period denoted by 35, the current commutates into the commutator circuit. Owing to the large amount of inductively stored energy in the network, in this case the commutator capacitor 170 is charged until the polarity is reversed, with the result that the voltage present at the thyristor 260 becomes positive.

At the third time 23, the thyristor 260 is now switched on. As a result of this, the current now commutates increasingly into the thyristor series circuit. The voltage drop across the resistor 250 therefore increases. As a result, in turn the voltage at the auxiliary interrupter 110 becomes zero. This results in the source current 30 becoming zero as early as at the fourth time, in the present example at approximately 16 ms, while the current only reaches zero at the fifth time 25 of approximately 21.2 ms in the case of the first source current profile 31.

Figure 3:
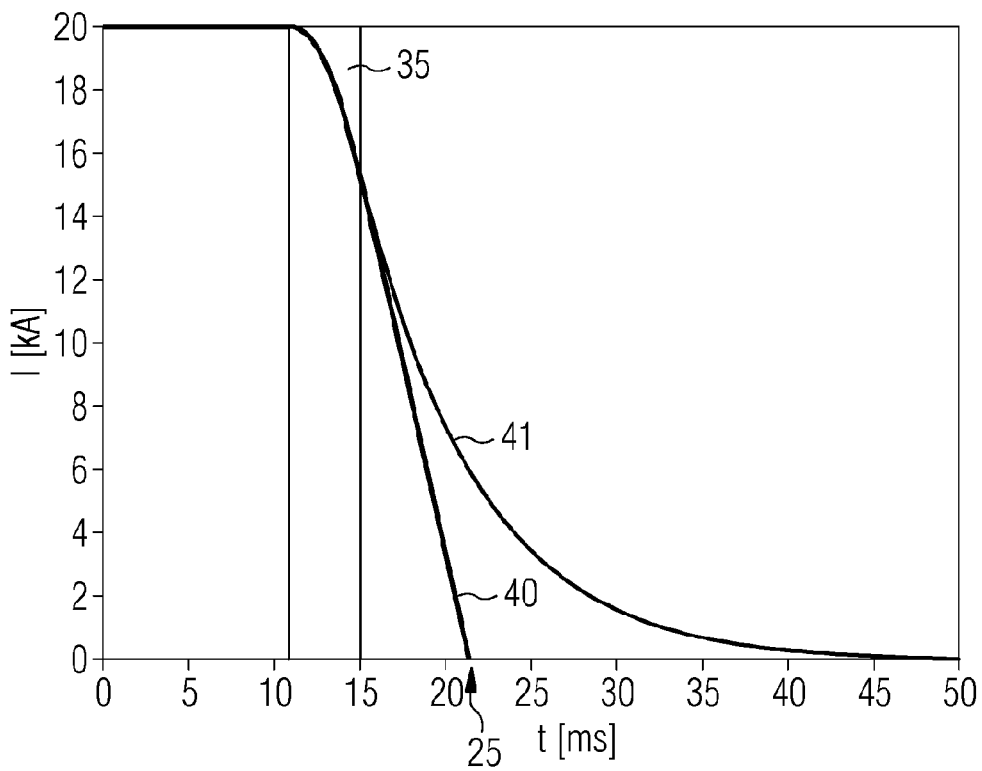
FIG. 3 shows a graph illustrating the line current profile of the circuit arrangement in comparison with a known circuit arrangement.
Figure 4:
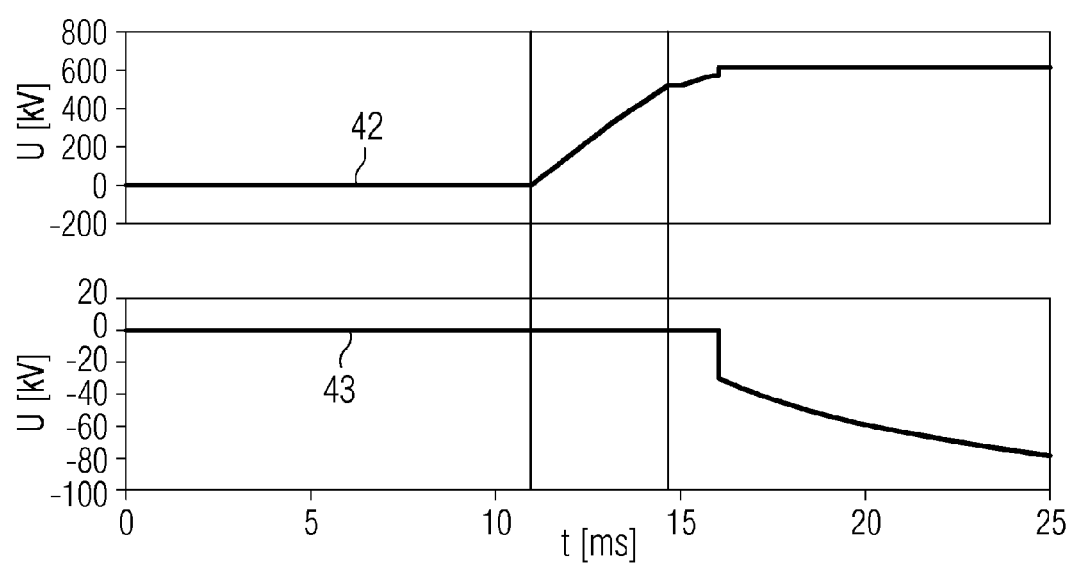
FIG. 4 shows a graph illustrating the voltage profile of the interrupters in the circuit arrangement.

FIG. 3 shows a graph illustrating the time profile of the associated first load current 40 without the thyristor series circuit and second load current 41 with the thyristor series circuit. FIG. 4 shows, plotted in voltages in kV over time in ms, the voltage profile 42 over the hybrid interrupter 120 and the voltage profile 43 over the auxiliary interrupter 110. The DC voltage line circuit breaker 100 enables physical isolation in a DC line system at energies of up to 20 MJ within a time of the order of magnitude of 10 ms. In this case, the isolation time is reduced by approximately 14% in comparison with a switch without the thyristor branch. This corresponds to what is conventional in AC voltage line systems. The DC voltage line circuit breaker 100 enables the use of DC line systems with meshes, i.e. DC line systems which do not only comprise a point-to-point connection. The DC voltage line circuit breaker 100 is particularly advantageous for use in multiterminal offshore high-voltage feed points, which use renewable energy sources. The DC voltage line circuit breaker 100 can be used in combination with wind turbines, for example. A further advantage of the described circuit breaker consists in that the energy absorber can be smaller since the energy is allowed to decay in the additional thyristor branch.

The invention claimed is:

1. A DC voltage line circuit breaker, comprising:
   a first node;
   a second node;
   a third node;
   a fourth node;
   a fifth node;
   a first interrupter disposed between said first node and said fourth node;
   a second interrupter disposed between said fourth node and said third node;
   a parallel circuit containing a commutator device and an energy absorber disposed between said fourth node and said fifth node;
   a switch disposed in series with said parallel circuit; and
   a series circuit having a semiconductor switch and a resistor disposed between said second node and said third node.

2. The DC voltage line circuit breaker according to claim 1, wherein said semiconductor switch is a thyristor.

3. The DC voltage line circuit breaker according to claim 1, wherein said commutator device contains a another series circuit having a commutator resistor, a commutator coil and a commutator capacitor.

4. The DC voltage line circuit breaker according to claim 1, wherein said first interrupter is an SF6 interrupter.

5. The DC voltage line circuit breaker according to claim 1, wherein said second interrupter is a vacuum interrupter.

6. A method for operating a DC voltage line circuit breaker containing:
   a first node;
   a second node;
   a third node;
   a fourth node;
   a fifth node;
   a first interrupter disposed between the first node and the fourth node;
   a second interrupter disposed between the fourth node and the third node;
   a parallel circuit containing a commutator device and an energy absorber disposed between the fourth node and the fifth node;

a switch disposed in series with the parallel circuit; and
a series circuit having a semiconductor switch being a thyristor and a resistor disposed between the second node and the third node, which comprises the steps of:
opening the switch at a beginning of the method;
detecting a rise in a current intensity of an electrical current flowing in the DC voltage line circuit breaker;
closing the switch;
opening the second interrupter;
switching on the thyristor; and
opening the first interrupter.

7. A DC line system, comprising:
a DC voltage line circuit breaker, containing:
- a first node;
- a second node;
- a third node;
- a fourth node;
- a fifth node;
- a first interrupter disposed between said first node and said fourth node;
- a second interrupter disposed between said fourth node and said third node;
- a parallel circuit containing a commutator device and an energy absorber disposed between said fourth node and said fifth node;
- a switch disposed in series with said parallel circuit; and
- a series circuit having a semiconductor switch and a resistor disposed between said second node and said third node.

8. The DC line system according to claim 7, further comprising a mesh.

* * * * *